United States Patent [19]

Grunwald et al.

[11] 3,864,147

[45] Feb. 4, 1975

[54] METHOD OF IMPROVING THE BONDING CAPABILITY OF POLYMER SURFACES FOR SUBSEQUENTLY APPLIED COATINGS, AND PRODUCTS THEREOF

[75] Inventors: John J. Grunwald, New Haven; Eugene D'Ottavio, Thomaston; Michael S. Lombardo, Waterbury, all of Conn.

[73] Assignee: MacDermid Incorporated, Waterbury, Conn.

[22] Filed: Sept. 25, 1972

[21] Appl. No.: 291,717

[52] U.S. Cl........... 117/47 A, 117/138.8 R, 156/22, 204/30, 204/33, 204/38 B

[51] Int. Cl........................................... B44d 1/092

[58] Field of Search...... 117/47 A, 138.8 R; 156/22; 204/30, 33, 38 B

[56] References Cited

UNITED STATES PATENTS

| | | | |
|---|---|---|---|
| 3,035,944 | 5/1962 | Sher et al. | 117/47 A X |
| 3,331,710 | 7/1967 | Lodeesen et al. | 156/22 X |
| 3,607,484 | 9/1971 | Marukawa et al. | 156/22 |
| 3,655,467 | 4/1972 | Sopp | 156/22 |
| 3,666,549 | 5/1972 | Rhodenizer et al. | 117/213 X |
| 3,820,933 | 11/1971 | Grunwald et al. | 117/47 A X |

OTHER PUBLICATIONS

Guidebook Directory for 1968, 36th Annual Edition, Metal and Plastics Publications, Inc., 1967, pp. 507–514.

*Primary Examiner*—Mayer Weinblatt
*Assistant Examiner*—Harris A. Pitlick
*Attorney, Agent, or Firm*—Steward & Steward

[57] ABSTRACT

A procedure is disclosed for modifying the topography of the surface of a polymer substrate to improve the bonding capability of the surface of the polymer in respect to subsequently applied coatings such as metal films, paints and inks. The procedure involved comprises first laminating a sacrificial, anodized metal foil to the substrate surface by heat and pressure, chemically stripping away that foil and then developing preferably, by a supplemental chemical stripping treatment, a network of microscopic fissures and cracks which is believed to incipiently form in the surface by the laminating process. Thereafter the treated substrate may be activated and electrolessly plated by conventional methods, followed by an added electrolytic or electroless plating if desired, to provide a metal film of execellent adhesion. Alternatively, standard vacuum metallizing procedures may be used to provide the initial or finished metal coating. Adhesion of other, nonmetallic, coatings such as paints and inks is also improved by the process.

15 Claims, 2 Drawing Figures

METHOD OF IMPROVING THE BONDING CAPABILITY OF POLYMER SURFACES FOR SUBSEQUENTLY APPLIED COATINGS, AND PRODUCTS THEREOF

BACKGROUND OF THE INVENTION

This invention relates to a method of preparing a polymer surface in order to provide improved bonding characteristics for subsequently applied coatings of metals, pigments and the like, and to polymer substrates resulting from the treatment so disclosed.

The method here disclosed is generally similar to that described in U.S. Pat. Nos. 3,620,933 and 3,666,549, in that initially a sacrifical metal foil is bonded by heat and pressure to a surface of the polymer substrate which is ultimately to be metal plated or otherwise coated. The sacrificial metal foil is chemically stripped or dissolved off the surface of the substrate, and the finished coating is thereafter applied. This invention is directed to the improvement in the foregoing procedure obtained by combining with the processing steps previously taught, a supplemental chemical stripping step which more effectively potentiates the polymer surface for good adhesion of the subsequently applied coating. The improvement obtained by the combination of what is herein termed as chemical stripping is evidenced not only in the greater bonding or peel strengths obtained between the substrate and finished coating, but more especially in greater consistency and uniformity of such bond strengths. This latter is especially significant for practical applications where it is not always possible to operate under ideal, laboratory-controlled conditions of surface cleanliness, uniform bath temperatures and concentrations, and relatively few parts undergoing treatment at one time.

In the prior teaching, the sacrificial metal foil which has been bonded to the polymer substrate is removed by subjecting the composite to a chemical stripping or dissolution operation until all visible traces of the original metal foil are eliminated. In the case of aluminum foil, which is generally the practical sacrificial metal to employ from an economic standpoint, an acid, such as hydrochloric, or a strong alkali metal hydroxide, such as sodium hydroxide, is used in the etchant bath. When the substrate is free of visible traces of the sacrifical metal, it is then rinsed and if it is to be electrolessly plated, it is activated for this by known procedures.

The additional step now found to provide substantial improvement in the foregoing procedure involves subjecting the acid or alkali-stripped substrate to a further chemical treatment. It is postulated that, whereas the principal acid or alkali stripping operation is effective in removing visible metal, there still remains on the surface of the polymer, traces of metal oxide embedded in the surface. Such metal oxide results of course from natural oxidation or the express anodizing of the metal foil prior to its application to the surface of the substrate. By treating the plastic surface, following stripping of the metal in the usual acid or alkali solution, with a supplemental chemical solution specifically suitable to remove traces of metal oxide, a superior bond results between the plastic surface and a subsequently applied coating film of metal or pigment. While it is possible, given enough time, to employ the normal stripping bath for removing the metal oxide as well as the metal itself, the efficiency of such a procedure is poor and the use of a supplemental step to attack the oxide more specifically is definitely to be preferred. Aqueous solutions of phosphoric acid, or the soluble pyrophosphate salts, are preferred. The concentration of these materials in solution will vary in accordance with the operating temperature of the bath as well as the length of time in the bath. Solutions of phosphoric acid as low as 4 percent (weight) operated at 150°F., give adequate results in about 15 minutes. A 50 percent (weight) solution of phosphoric acid at room temperature will give equivalent results in about 5 minutes. The preferred conditions are approximately 45 percent (weight) phosphoric acid at 160°F. for about 5 minutes.

It is postulated that the improved results obtained by following the procedure as disclosed by the invention herein is a fact due to the removal of traces of metal oxides adhering to the surface of the substrate after the normal metal stripping step. Some evidence to support this is available from electron microscope scan prints. Typical prints are shown in the accompanying drawings in which.

Figure 1:
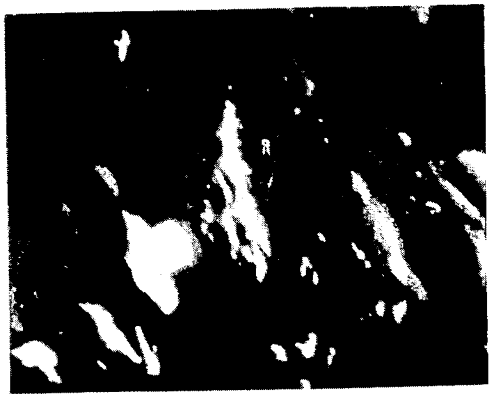
FIG. 1 is an electron microscopic scan print at a magnification of 10,000 of the surface of a glass-epoxy substrate from which an anodized aluminum foil has been stripped with hydrochloric acid.
Figure 2:
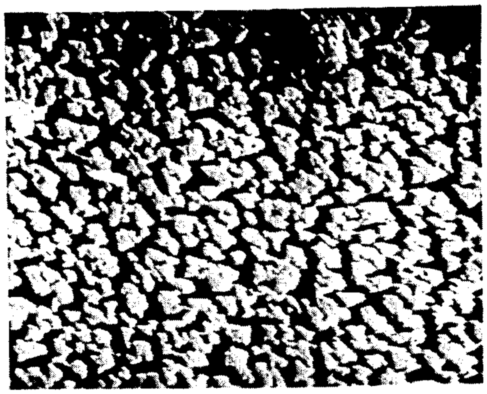
FIG. 2 shows the surface of an identically treated substrate, which has further been treated in accordance with the teachings of this invention. (10,000X Mag.)

The mechanism of the supplemental chemical treatment of a polymer substrate, following the stripping of the scarificial metal foil, is not fully understood. As suggested above, it is now believed that the supplemental treatment probably removes residual metal oxide originally present on the anodized metal and imbedded in the surface of the substrate during the laminating process and relatively more resistant to the normal chemical etch than the metal itself. Reference to the photomicrograph seen in FIG. 1 shows a relatively smooth, continuous surface topography. By comparison it is noted that in FIG. 2, the surface of the substrate shows a high elaborate network of fissures and cracks which are "masked" until the surface has been treated with phosphoric acid or equivalent, as discussed generally above. It seems probable that these fissures are the impressions of the anodized metal surface caused by pressing that surface against the polymer surface in the laminating process. In the epoxy-glass panels here shown, the depth of the fissures appears to range up to as much as about 10,000 angstroms, while the area of the lands or top faces of the cells defined by the fissures range in diameter from as little as 100 angstroms up to 10,000. From research data available, it appears that for practical purposes, a minimum depth of fissure of 200 angstroms is required for bonding, but the optimum range appears to be somewhat higher; e.g., a depth of 2,000 to 4,000 angstroms.

The invention herein disclosed is further illustrated by the following examples which compare results obtained using the known prior art procedure with the results obtained by using various modifications of the invention process.

PRIOR ART

A glass-epoxy laminate having a sacrificial aluminum foil cladding is first prepared by a method such as that described in U.S. Pat. No. 3,620,933, Example I. This comprises taking a sheet of aluminum foil having a thickness of about 0.002 inch and immersing it in an alkaline soak cleaner bath for 5 minutes at a temperature of 190°F. to remove surface grime and oil. The cleaned aluminum foil is then preferably etched slightly in an ammonium bifluoride solution at room temperature for 3 minutes preliminary to anodic treatment in an electrolytic bath containing phosphoric acid (10 percent by weight) for 10 minutes at a current density of 10 A.S.F., and at a temperature of 110°F.

This anodically treated aluminum foil is then placed in a laminating press on top of stacked sheets (e.g., 8 in number) of glass fiber reinforced epoxy B-stage resin, each sheet having a thickness of about 0.004 inch. A release strip, such as a sheet of cellophane, is placed between the epoxy resin and the platten of the press in order to prevent sticking during the curing operation. The press, preheated to a temperature of 350°F., is closed and the laminate components are preheated at a pressure of about 5 p.s.i. for 30 seconds, after which the pressure is raised to 250 p.s.i. and the curing is continued at the same temperature for about 15 minutes. The resulting composite is a hard, infusible, resin substrate having the aluminum foil permanently adhered to its surface.

This aluminum clad laminate is optionally then cleaned of any surface grime and is immersed, sprayed or otherwise contacted with an etchant solution capable of dissolving all visible traces of the aluminum foil. As described in Example VII of the aforesaid U.S. Pat. No. 3,620,933, any of the usually employed aluminum etchant solutions, such as hydrochloric acid (10%–40% by volume), or alkali metal hydroxide (5%–20% by weight), are effective. Typical treatment conditions comprise a solution temperature of 80°F to about 180°F., preferably about 100° to 130°F., for periods of 2 to 30 minutes, but normally about 5 minutes at the prefered temperature. When the substrate is free of visible aluminum foil, it is water rinsed in preparation for the next step. If the substrate is to be metal plated, it is next activated for electroless metal deposition. In this example, the procedure employed is the so-called one-step activation technique described in U.S. Pat. No. 3,532,518, Example I. This comprises immersing the substrate in a palladium-stannous chloride hydrosol activator solution, prepared in accordance with the teaching of the aforesaid patent, for about 3 minutes at room temperature; carefully rinsing and then immersing the substrate in an accelerating solution of fluoboric acid; rinsing again and then placing the substrate in a commercial electroless copper plating solution (e.g. "METEX 9030", MacDermid Incorporated, or equivalent) for a period of about 20 minutes at room temperature; and finally rinsing and electroplating an additional copper deposit to a thickness of about 1 mil. The plated substrate is dried and then subjected to an oven bake at 300°F. for about 1 hour.

Adhesion tests on such a product, using the standard technique of measuring the pull on a 1 inch wide strip of metal peeled from the surface and pulled 90° to that surface, shows an average value not in excess of 5 pounds per linear inch.

As a modification of the foregoing procedure, activation of the substrates for electroless plating by the so called "two-step" stannous chloride sensitizing, palladium chloride seeding method, in place of the one-step activation procedure mentioned, produces no significant difference in peel strength results.

The foregoing is provided for comparison with the following examples which illustrate several variations of the invention procedure.

EXAMPLE 1

The foregoing prior art procedure was duplicated through the step of stripping all visible traces of the sacrificial aluminum foil from the polymer substrate, followed by rinsing.

Unlike the previously described procedure, the next step in the operation comprises a further or supplemental chemical treatment of the substrate. The step here spoken of consists in immersing the substrate in, or otherwise contacting it with, a 45 percent (weight) phosphoric acid solution at a temperature of 160°–165°F. for about 5 minutes. Thereafter, the substrate is water rinsed, washed for about 1 minute in a 30 percent (volume) solution of hydrochloric acid at room temperature, and then activated and plated, following the correponding steps of the prior procedure, including baking.

In this case, the average bond strength of the plated deposit to the substrate is about 8 to 9 pounds per linear inch.

EXAMPLE 2

The procedure of Example 1 was duplicated in all respects, except in this case the phosphoric acid supplemental treatement was maintained for about 10 minutes at the same temperature (160°–165°F.). The resulting peel strength in the plated product averaged 7 to 9 pounds per linear inch.

EXAMPLE 3

The procedure of Example 1 was followed exactly, except that instead of using phosphoric acid in the supplemental treatment step, the solution contained potassium pyrophosphate at a concentration of 200 g. per liter. The time of treatment and temperature conditions remain the same as before. The peel strength obtained was again 7 to 9 pounds per inch.

The same test was run but the time of immersion of the substrate in the pyrophosphate solution was increased to 10 minutes. There was no appreciable difference in peel strength obtained.

EXAMPLE 4

The procedure of Example 3 was duplicated, except that the supplemental treatment consisted in first using the pyrophosphate solution for 5 minutes, and then using the phosphoric acid solution for 5 minutes. The average peel strength obtained was 6 to 9 pounds per inch.

EXAMPLE 5

The procedure of Example 1 was duplicated in all respects, except that instead of electrolessly copper plating the treated and activated substrate, it was electrolessly nickel plated using a commercial electroless nickel bath (e.g., "Macuplex 9340", MacDermid Incorporated). This was followed by electrolytic acid copper plating to provide a copper deposit of 1 mil, as before. The peel strength in this case was 5 to 6 pounds per inch.

A similar test, in which commercial electrolytic bright nickel (instead of copper) was plated over the electroless nickel, showed no change in peel strength.

EXAMPLE 6

A series of tests were run, again following the procedure of Example 1, but in this case the substrates employed were phenolic impregnated paper base laminates, designated in the trade as FR-2. The FR-2 panels gave peel strength values of 9 to 10 pounds per inch.

EXAMPLE 7

The procedure of Example 1 was followed, using FR-2 and FR-4 panels, and also substituting for phosphoric acid in the supplemental treatment the several etchant compositions noted below:

| Etchant Material | Peel Strength (lb/in) | |
|---|---|---|
| | Fr-2 | FR-4 |
| NaOH (75 g/l), 150°F., 5 min. | 3–6 | 7–9 |
| Chromic sulfuric acid, 150°F., 5 min. (1 part each to 2 parts water, by weight) | 3–4 | 4–5 |
| NaCN (50 g/l), 150°F., 5 min. | 2–3 | 4–5 |
| No supplemental etchant | less than 3 | less than 4 |

EXAMPLE 8

The procedure of Example 1 is again followed, using a glass-epoxy substrate, except that this time the sacrificial aluminum foil was anodized in sulfuric rather than phosphoric acid. The anodizing operation consisted in immersing the aluminum foil in a solution of 10 percent (wt.) sulfuric acid at a temperature of 130°F. for 4 minutes with an anodizing current rate of 15 A.S.F. All other operating steps remain the same, except that the substrate was first electrolessly plated with nickel ("Macuplex 9340") followed by electrolytic plating with acid copper to a thickness of 1 mil. The peel strength on panels so treated averages 10 pounds per inch.

EXAMPLE 9

A composite of sulfuric acid anodized aluminum foil and glass-epoxy substrate was prepared as described in Example 8. The aluminum foil was stripped in 30 percent hydrochloric acid and the resulting substrate immersed in aqueous sodium hydroxide solution (25 g/l) for 3 minutes at 150°F. The substrate is then plated electrolessly, as above, with nickel, followed by electrolytic plating of acid copper to provide a deposit thickness of 1 mil. Following a bake at 300°F. for 1 hour, the adhesion of the metal to the substrate is 7 pounds per inch.

EXAMPLE 10

The procedure illustrated by the foregoing examples using thermoset resin substrates is also applicable to thermoplastic substrates such as ABS. To illustrate this, an ABS plaque is used to form a composite with phosphoric anodized aluminum foil by pressing at 10 p.s.i., 250°F., for 2 minutes. This composite is immersed in 40 percent hydrochloric acid, 75°F., until all the aluminum foil is dissolved, and is then subjected to the supplemental phosphoric acid treatment, as in Example 2, rinsed, activated, electrolessly plated with nickel, followed by 1 mil acid electrolytic copper. After a bake at about 200°F., for 60 minutes, adhesion is 9 pounds per inch.

Any of the foregoing procedures may be further modified by the inclusion in the supplemental etching operation of a suitable surfactant, such as for example the addition of 0.1 percent by volume of "Catanac" a surfactant made by American Cyanamid and defined generally as a quaternary ammonium compound. Inclusion of such surfactant generally helps to assure a completely uniform coverage of the substrate by electroless nickel or copper.

When the chemical stripping solution employed in removing the metal foil is hydrochloric acid, the stripping solution may inculde a small but effective amount of soluble fluoride to enhance the etching effect. Generally the fluoride ion concentration can be on the order of 0.2M to 2.5M molar.

As shown above, the inclusion of the supplemental etchant step was found to more positively potentiate the polymer substrate surface for better adhesion of the subsequently deposited metal film. It is this supplemental treatment which fully develops the complex structure in the surface of the substrate, as typified in FIG. 2 of the drawings, where the fissures provide capillaries which appear to act strongly to absorb the activating solutions to which the plastic substrate is subjected prior to electroless plating. It is believed that this network of capillaries helps to achieve a more intimate contact between the metal and substrate which is a prime prerequisite for good metal-to-polymer adhesion.

As mentioned above, some adhesion between the substrate and metal is obtained without the use of the supplemental etchant treatment. In all such cases, however, the substrate must be left in the primary etchant solution for a long period of time at high temperatures, which is economically undesirable, as well as undesirable on account of adverse affect on the physical properties of the substrate.

Phosphoric acid is the supplemental etchant material of preference, along with the equivalent pyrophosphates. To be effective, the solution should be at least 0.25 molar with a practical upper limit of around 5 molar. This corresponds to solutions containing from 4 percent to 75 percent (weight) of phosphoric acid. As has been shown, sodium hydroxide is also operative but its use with paper phenolic substrates is definitely not preferred because of excessive etching of such substrate.

It also appears that instead of using a supplemental chemical step to insure satisfactory development of the desired network of fissures in the polymer substrate, one can use a combination of chemicals in a single stripping step to accomplish a similar effect. For example, phosphoric acid may be added into the normal hydrochloric acid stripping bath. A two-step treatment is, nevertheless, economically preferred.

What is claimed is:

1. A process of improving the topography characteristics of a plastic substrate for the bonding thereto of a permanent coating film, which comprises the steps of initially forming by heat and pressure a laminate of the plastic substrate and a sacrificial aluminum metal foil having an oxidized surface facing the substrate, then stripping said sacrificial aluminum metal foil from the laminate thus formed by treatment in an aqueous etchant solution effective to dissolve said sacrificial aluminum metal foil wherein said treatment always includes, either during or subsequent to removal of said metal but before any other treatment, subjecting said substrate to an aqueous solution of phosphoric acid, a soluble pyrophosphate, or both.

2. A process of improving the topography characteristics of a plastic substrate surface for the bonding thereto of a permanent coating film, which comprises the steps of initially forming by heat and pressure a laminate of the plastic substrate and a sacrificial aluminum metal foil having an oxidized surface facing the substrate, chemically stripping in an aqueous etchant solution all visible traces of said sacrificial aluminum metal foil from the surface of the substrate, and then subjecting the stripped substrate to treatment in an aqueous solution of phosphoric acid or a soluble pyrophosphate effective in removing all trace metal oxides from the surface of the substrate after the first etching step, and thereafter rinsing and applying said permanent coating film.

3. A process as defined in claim 2, wherein said sacrificial metal foil is aluminum foil anodized in phosphoric or sulfuric acid, and said aqueous solution effective to remove trace metal oxides contains a phosphate material selected from the group consisting of phosphoric acid and the alkali metal ammonium pyrophosphates.

4. A process as defined in claim 3, wherein the concentration of said phosphate material is at least about 0.25 molar.

5. A process as defined in claim 3, wherein the supplemental etchant treatment is continued for from 3 minutes to 15 minutes at a solution temperature of from 80°F. to 180°F. with a phosphate concentration equivalent to from 4 percent to 75 percent (weight) of phosphoric acid.

6. A process as defined in claim 2, wherein said sacrificial metal foil is aluminum which has been anodized in aqueous phosphoric acid solution to produce an anodized film of at least about 200 Angstroms thick; and wherein said laminate of plastic substrate and anodized aluminum foil is contacted with a hydrochloric acid etchant solution to strip said aluminum foil therefrom, and said stripped substrate is supplementally treated in a 45 percent (weight) aqueous phosphoric acid solution at a temperature of 160°F. for 5 minutes.

7. In the electroless metal plating of plastic substrates in which a laminate is initially formed by bonding an anodized aluminum foil to a resin substrate by heat and pressure, the aluminum foil being then chemically stripped from the plastic surface, the surface activated and then plated with an adherent film by immersion in an electroless metal plating solution, the improvement which comprises: subjecting the plastic substrate to further chemical treatment, supplemental to the said regular stripping step, to substantially eliminate traces of metal oxides adhering to the surface, wherein said supplemental treatment involves immersing the stripped substrate in a solution of phosphoric acid or soluble pyrophosphate.

8. The improvement in electroless plating of thermoset resin substrates as defined in claim 7, wherein said supplemental chemical stripping step is continued until development of a topographically complex but uniform network of distinct fissures and cracks of a depth on the order of at least 200 A appears in the substrate surface, as shown by an electron scan microphotograph of the surface of the substrate.

9. The improvement in electroless plating as defined in claim 7, wherein said supplemental chemical stripping step comprises immersing the regularly stripped resin substrate in an aqueous solution of phosphoric acid.

10. The improvement in electroless plating as defined in claim 9, wherein said supplemental chemical treatment solution contains from 4 percent to 75 percent (weight) phosphoric acid and said substrate is maintained in said solution at a temperature of from 80°F. to 180°F. for a period of 3 to 15 minutes.

11. The improvement in electroless plating as defined in claim 7, wherein said supplemental chemical stripping step comprises immersing the regularly stripped resin substrate in an aqueous solution of a soluble pyrophosphate.

12. The improvement in electroless plating as defined in claim 11, wherein said pyrophosphate is sodium, potassium or ammonium pyrophosphate at a concentration of from 10 g/l to saturation for a period of from 3 to 15 minutes at a solution temperature of 100°F. to 180°F.

13. The improvement in electroless plating as defined in claim 7, wherein said supplemental chemical stripping step comprises immersing the regularly stripped resin substrate in an aqueous cuastic solution of an alkali metal hydroxide followed immediately by immersion of said substrate in an aqueous solution of phosphoric acid or a soluble pyrophosphate.

14. A process of improving the topography characteristics of a polymerized plastic substrate surface for the bonding thereto of a permanent metallic film, which comprises the step of initially forming a laminate of the plastic substrate and a sacrificial anodized aluminum foil by heat and pressure, chemically stripping said foil from the substrate surface in an aqueous etchant solution of a strong acid or base to remove all visible trace of the metal, supplementing said etchant step by subjecting the stripped substrate to an aqueous solution of phosphoric acid or a soluble pyrophosphate, and thereafter rinsing and electrolessly plating said permanent metallic film on said substrate.

15. A process as defined in claim 14, wherein said sacrificial aluminum foil is chemically stripped from said substrate in hydrochloric acid solution containing a fluoride ion in a concentration of at least about 0.2M.

* * * * *